United States Patent [19]

Maguire

[11] Patent Number: 6,007,236
[45] Date of Patent: Dec. 28, 1999

[54] WEIGH SCALE BLENDER AND METHOD

[76] Inventor: Stephen B. Maguire, 1549 E. Street Rd., Glen Mills, Pa. 19342

[21] Appl. No.: 08/763,053

[22] Filed: Dec. 10, 1996

Related U.S. Application Data

[60] Provisional application No. 60/008,498, Dec. 11, 1995, and provisional application No. 60/016,064, Apr. 23, 1996.

[51] Int. Cl.$^6$ .............................. B01F 15/02; B01F 15/04; B29C 31/06; B29C 7/60

[52] U.S. Cl. ...................... 366/141; 366/151.1; 366/76.1; 366/76.6; 177/122

[58] Field of Search ................................ 366/141, 152.1, 366/181.1, 76.1, 76.9, 76.91, 76.6; 177/66, 64, 70, 122; 264/78, 75; 222/77

[56] References Cited

U.S. PATENT DOCUMENTS

| | | |
|---|---|---|
| 3,111,115 | 11/1963 | Best . |
| 3,115,276 | 12/1963 | Johanningmeier . |
| 3,209,898 | 10/1965 | Beebe et al. . |
| 3,348,848 | 10/1967 | Lucking et al. . |
| 3,470,994 | 10/1969 | Schnell et al. . |
| 3,959,636 | 5/1976 | Johnson et al. . |
| 3,985,262 | 10/1976 | Nauta . |
| 4,026,442 | 5/1977 | Orton . |
| 4,108,334 | 8/1978 | Moller . |
| 4,148,100 | 4/1979 | Moller . |
| 4,185,948 | 1/1980 | Maguire .................................. 417/477 |
| 4,219,136 | 8/1980 | Williams et al. . |

(List continued on next page.)

FOREIGN PATENT DOCUMENTS

| | | |
|---|---|---|
| 318170A2 | 7/1988 | European Pat. Off. . |
| 507689A2 | 4/1991 | European Pat. Off. . |
| 0507689A2 | 4/1992 | European Pat. Off. . |
| 0587085 | 3/1994 | European Pat. Off. . |
| 0743149 | 11/1996 | European Pat. Off. . |
| 2517087 | 9/1982 | France . |
| 3541532A1 | 5/1986 | Germany . |
| 3923241 | 1/1991 | Germany . |
| 4323295 | 2/1995 | Germany . |
| 2081687 | 5/1980 | United Kingdom . |

OTHER PUBLICATIONS

Sheet of 2 photographs of Mould–Tek gravimetric blender, circa 1993.

Sheet of 2 photographs of Motan gravimetric blender and feeding system with Maguire Products, Inc. controls, circa 1993.

Sheet of 3 photographs of UNA–DYN gravimetric blender, circa 1993.

Sheet of 2 photographs of Maguire Products, Inc. gravimetric blender wiht Conair hoppers and feeding system, circa 1993.

Sheet of 1 photograph of Hydracolor gravimetric blender, circa 1993.

Advertisement entitled "Machinery and Systems for Extrusion is Our Only Business" by Process Control Corporation, circa 1993.

Advertisement entitled "Weigh Blender Delivers Unmatched Accuracy" by Universal Dynamics, Inc., circa 1993.

Advertisement entitled "A Full Line–up of Blender Solutions . . . Priced Right!" by HydReclaim, circa 1993.

(List continued on next page.)

*Primary Examiner*—Tony G. Soohoo
*Attorney, Agent, or Firm*—Charles N. Quinn, Esq.

[57] ABSTRACT

A gravimetric blender including a frame, a weigh bin, a device connected to the frame for sensing weight of the bin and any material contained therein, a mix chamber below the bin, connected to the frame, a piston for selectably releasing material in the bin downwardly into the mix chamber and an elastomer connecting a sensor device to the frame and damping transfer of vibration and shock motion therebetween. The method includes metering solid resinous materials until preselected weight of the respective materials are at the weigh station, metering liquid color until a preselected weight of color is at the weigh station, and providing the metered solid resinous materials and metered liquid color material to a mixing station for manufacturing processing via molding or extrusion.

4 Claims, 9 Drawing Sheets

U.S. PATENT DOCUMENTS

| | | |
|---|---|---|
| 4,402,436 | 9/1983 | Hellgren . |
| 4,454,943 | 6/1984 | Moller . |
| 4,473,173 | 9/1984 | DeGroff et al. .................... 222/68 |
| 4,475,672 | 10/1984 | Whitehead . |
| 4,498,783 | 2/1985 | Rudolph ................................ 366/132 |
| 4,525,071 | 6/1985 | Horowitz et al. ..................... 366/152 |
| 4,571,416 | 2/1986 | Jarzombek et al. .................. 525/474 |
| 4,581,704 | 4/1986 | Mitsukawa ............................ 366/160 |
| 4,705,083 | 11/1987 | Rossetti ................................. 366/605 |
| 4,756,348 | 7/1988 | Moller . |
| 4,793,711 | 12/1988 | Ohlson ..................................... 366/18 |
| 4,830,508 | 5/1989 | Higuchi et al. ....................... 366/141 |
| 4,848,534 | 7/1989 | Sandwall . |
| 4,850,703 | 7/1989 | Hanaoka et al. ..................... 366/160 |
| 5,110,521 | 5/1992 | Moller . |
| 5,116,547 | 5/1992 | Tsukahara et al. ..................... 264/78 |
| 5,143,166 | 9/1992 | Hough . |
| 5,148,943 | 9/1992 | Moller . |
| 5,172,489 | 12/1992 | Moller . |
| 5,225,210 | 7/1993 | Shimoda ............................. 366/76.9 |
| 5,252,008 | 10/1993 | May, III et al. . |
| 5,261,743 | 11/1993 | Moller .................................. 366/196 |
| 5,341,961 | 8/1994 | Hausam . |
| 5,423,455 | 6/1995 | Ricciardi et al. ....................... 177/66 |
| 5,767,455 | 6/1998 | Mosher . |

OTHER PUBLICATIONS

Advertisement entitled "New From HydReclaim—Now Processors Can Economically Achieve Continuous Gravimetric Blending" by HydReclaim, circa 1993.

Article entitled "Control Loading Systems" from Plastics Technology, Oct. 1995, p. 41.

Advertisement "Introducing our 400 VME–II Gravimetric Blender" by HydReclaim Corporation, circa 1993.

Four page brochure entitled "Gravimix Better Quality through Research", circa 1993.

Four page brochure entitled "Conomix Plus Volumetric Blender"dated Aug. 1993.

Four page brochure entitled "Conair Franklin Autocolor Y Mezclador"dated Mar. 1995.

Two–sided flyer entitled "GB 140 Series Compact Auto Weigh Blender" published by Conair Franklin in the United States, Jun. 1994.

Sis page brochure entitled "Graviblend Precise Continuous Weigh Blenders" published by Ktron Vertech, Jun., 1991, United States.

Six page brochure entitled "Piovan Gravimetric Blenders MDW" publlished by Piovan Srl, Oct. 1993, Venezia, Italy.

One page flyer entitled "Gravimix, The New Gravimetric Blending Generation" published by Ferlin, De demsvaard, Holland, circa 1993.

Four page brochure entitled "When you Weigh it All Up . . . " published by Ferlin Trading, Holland, circa 1993.

Thirty–two page catalog entitled "Maguire Color Blending Equipment" published by Maguire Products, Inc., 1993, United States.

Two page brochure entitled "Mould–Tek Bulk Handling Systems" published by Mould–Tek Industries, Inc. in Canada, circa 1993.

Brochure entitled "Plastic Molders and Extruders: "published by Maguire Products, Inc., 1995.

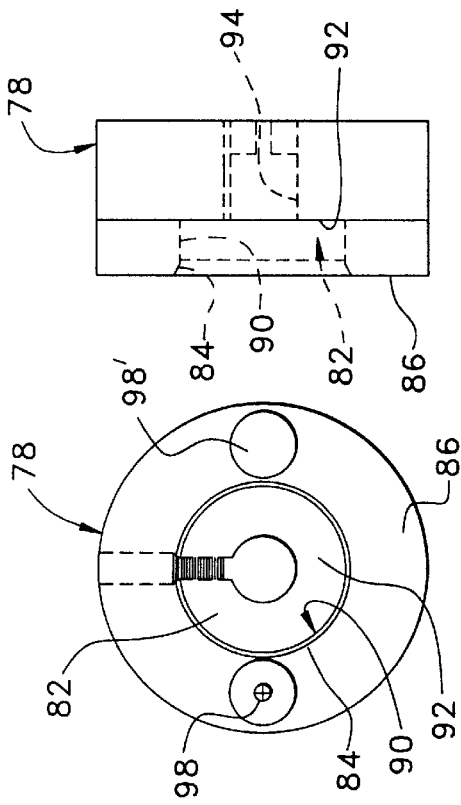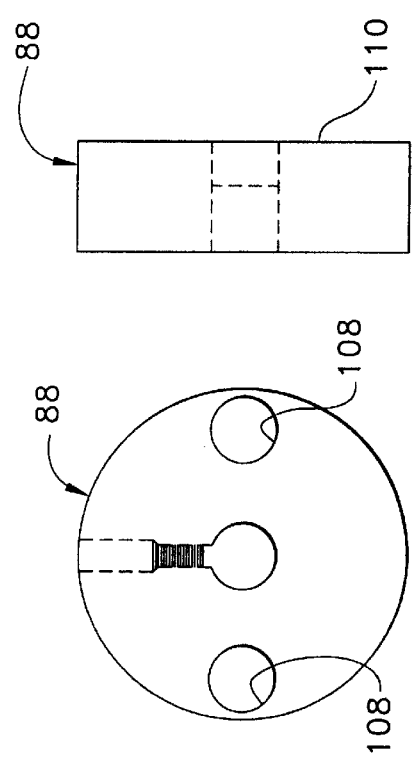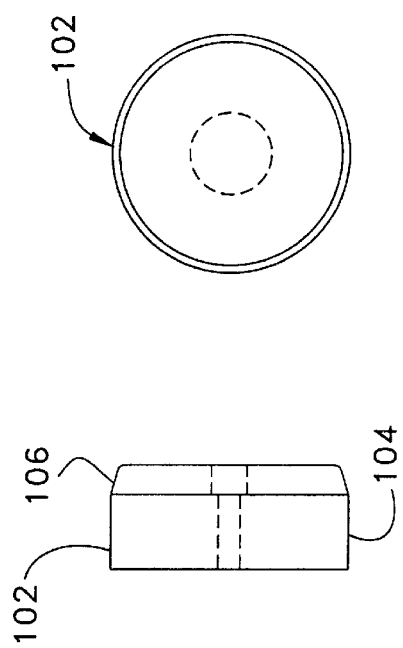

WEIGH SCALE BLENDER AND METHOD

CROSS-REFERENCE TO RELATED PATENT APPLICATIONS

This patent application is based on, discloses subject matter in common with and is entitled to the benefit of the filing dates of provisional U.S. patent application Ser. No. 60/008,498 filed Dec. 11, 1995 in the name of Steven Maguire and entitled "Gravimetric Blender with Tool Operated Solenoid Valve Override and Axially Self-Aligning Motor-Mixer Coupling" and Ser. No. 60/016,064 filed Apr. 23, 1996 in the name of Steven Maguire and entitled "Gravimetric Blender/Liquid Color Pump Combination".

BACKGROUND OF THE INVENTION

This invention relates generally to methods and apparatus for providing precisely measured amounts of granular materials and, optionally, precisely measured amounts of coloring agent(s), particularly pigment in liquid form, preparatory to further processing of the combined granular materials and, optionally, liquid coloring agent(s), and specifically to weigh scale blenders, optionally in combination with color addition pumps, providing precisely measured amounts of plastic resin material, and, optionally liquid coloring agents, and mixing these components prior to supplying the blended mixture to plastics manufacturing and processing equipment such as plastic injection molding, compression molding and extrusion equipment.

FIELD OF THE INVENTION AND DESCRIPTION OF THE PRIOR ART

The modern weigh scale blender was essentially originated by the applicant of this invention and is widely used throughout the world by industries concerned with precision feeding of granular material, especially plastic resin material.

Weigh scale blenders operate by blending solid plastic resin material components and additives, by weight, in batches. Typically batches of material may consist of several solid material components. One of these may be "regrind", consisting of ground plastic resin which had previously been molded or extruded and which either resulted in a defective product or was excess material not formed into a desired product.

Another component may be "natural" plastic resin which is virgin in nature in the sense that it has not previously been processed into a molded or extruded plastic part.

Yet another component may be a solid color material, typically flakes or freeze dried material, used to produce a desired color of the finished plastic part.

Still yet another component may be an additive used to adjust the blend to provide required performance characteristics during molding, extrusion or subsequent processing.

The weigh scale blender as originated by the applicant and as copied widely throughout the world typically includes hoppers for each of the components of the solid material to be blended together. Typically several hoppers or several compartments in a hopper may be provided, such as one compartment for "regrind" material, one compartment for "natural" material, one component for solid color additive material and one compartment for "additive".

When the weigh scale blender operates, the unit desirably operates automatically, adding each of the component solid materials in the proper, desired percentages. Each solid material component is dispensed by weight into a single weigh bin. Once the proper amounts of each component have been serially dispensed into the weigh bin, all of the components are dropped together into a mixing chamber from the weigh bin.

Mixing is performed, preferably continuously, and preferably even as additional batches component are dispensed in the mixing chamber. When mixing is complete, the resulting blend is preferably provided directly to the desired molding or extrusion machine.

It is known to provide feedback control of the dispensed amounts of each solid material component provided to the weigh bin and measured by weight so that in the event of an error in the amount of a dispensed component, the succeeding batch may have the blend adjusted to account for the error detected in the preceding batch of blended material.

As one of the components forming a part of the resulting blend it is known to supply solid color additives to the blend in order to provide a blend of a desired color. These color additives may be flaked pigments on wax carriers or in freeze dried form. It is also known to provide the color as pigment powder constituting one component of the resulting blend.

When preparing blends of resinous plastic material for molding or extrusion, when color amounts are too low the error is visible and a correction to increase color may be effectuated by an operator. However, when color amounts are too high, the problem is not visible and operators manually operating the process normally do not make any adjustment in the amount of color. Hence adjustments are frequently made to increase the amount of color materials supplied to a blend but almost never is the amount of color supplied to the blend reduced.

Liquid color material cannot be preblended into one of the solid material components and stored because of the danger inherent and difficulties attendant to clean-up in the event of component failure. Hence, liquid color, when used in plastics material processing heretofore, has been metered directly into the throat of a molding press or an extrusion machine, at a position to join the solid resinous material blend just prior to the molding or extrusion operation. This approach creates difficulties, among them being compensating for addition of pre-colored regrind solid material to the material mix.

When regrind is added to the blend of plastic resin materials, the regrind already contains the necessary color; such regrind need not be colored a second time. When metering resinous material at the throat of a molding press or an extrusion machine, such metering is conventionally performed volumetrically. Hence, the presence of already colored regrind, not requiring additional coloration, cannot be detected. As a result, excess liquid color is typically added to the blend, sometimes producing an unacceptable product and always resulting in the use of unneeded color material, which is undesirable and results in unnecessary expense.

Weigh scale blenders typically use one or more load cells to detect the weight of the weigh bin and material contained therein. Vibrational and shock loading of the load cells may result in erroneous measurements of the weight of the weigh bin and the material contained therein. These erroneous measurements may result in addition of excess material or an insufficient amount of a material component in a subsequent batch thereby producing a batch of blended material deviating from the desired specifications. The load cells are subject to some vibration and shock loading due to the presence of pneumatic piston-cylinder combinations typically connected to the frame of the weigh scale blender and used to dispense solid granular resinous material from a hopper downwardly into the load bin.

Further vibrational and shock loading of the load cells may result from use of typically pneumatically driven piston-cylinder combinations to empty the weigh bin when the weight measurement is complete. Yet further vibrational and shock loading of the load cells may result from operation of the mixing chamber and the motor driving a mixing means within the mixing chamber. Because the frame of the weigh scale blender must be a rigid, high strength structure to provide the required strength to support the material storage hoppers and other components of the weigh scale blender, the weigh scale blender frame is typically steel. Since the frame is steel and rigid, shock and vibrational loads applied to the frame are readily transmitted along the frame and received by the various components of the weigh scale blender connected to the weigh scale blender frame.

When the weigh scale blender is mounted directly on a plastics material processing machine such as an extruder or, more particularly, an injection molding machine, the load cells of the weigh scale blender can be subjected to very substantial shock and vibrational loading. Injection molding machines have heavy steel platens and molds which open and close as parts are molded and ejected. There is a considerable amount of movement in an injection molding machine and the parts which move are heavy. Hence shock loads, which continuously propagate throughout injection molding machines and hence propagate through the weigh scale blender when the blender frame is bolted to the injection molding machine, maybe quite substantial.

In weigh scale blenders utilizing single load cells, loads on a cell may be substantial. In single load cell weigh scale blenders the single load cell has the weight of the weigh bin cantilevered on an arm and the cell bears the entire weight of the weigh bin and the material contained therein. Hence vibrational loading of the frame of the weigh scale blender may produce substantial vibrational loading of the load cell with stress to the load cell due to the weight carried by the load cell. The cantilevering of the weigh bin from the load cell results in high moments of inertia being applied to the load cell when the load cell is subject to vibration and shock loading.

SUMMARY OF THE INVENTION

In one of its aspects this invention provides a weigh scale blender/color addition pump combination where the weigh scale blender includes a frame, a hopper supported on the frame, a weigh bin below the hopper and load sensing means mounted on the frame for sensing weight of the bin including material contained within the bin.

The weigh scale blender further preferably includes preferably pneumatic piston-actuated means, preferably connected with the hopper, for releasing material within the hopper towards the weigh bin. A mix chamber preferably below the bin preferably includes mixing means therewithin.

The weigh scale blender preferably further includes pneumatically actuated means for releasing material within the bin into the mix chamber. A motor preferably rotates the mixing means.

Respecting the combination of the weigh scale blender and the color addition pump means for supplying liquid color to the material mix for blending therewith, the pump means supplying liquid color may desirably be a peristaltic pump or a progressive cavity pump. The liquid color is supplied by such a liquid pump in an amount measured by weight in the blender, in the same manner as the other, solid material components of the resulting material blend are added. Peristaltic pumps are preferred.

Gravimetric blending using a weigh scale blender of the type to which this invention relates permits detection of the presence of colored solid regrind material and resultant adjustment of the amount of liquid color being added. This invention, in one of its aspects combining a liquid color supply pump with a weigh scale blender resulting in addition of liquid color to the material blend provides many of the same advantages as when blending just dry plastic powder and concentrated plastic resin pellets.

When these granular solid and liquid materials are added to the weigh scale blender there is precise metering, no over-coloring and no danger of recoloring regrind material. Hence the invention in one of its aspects allows liquid color material to be added and metered using the same techniques as solid plastic resin material, which techniques are considerably easier, more efficient and more accurate than liquid color handling techniques.

In another of its aspects this invention embraces a method for preparing plastic resin material for manufacturing processing such as molding or extrusion. The method includes serially metering respective solid resinous materials to the weigh station until preselected weights of the respective materials are at the weigh station. The method further includes metering liquid color to the weigh station to join at least one of the materials which have been metered to the station until a pre-selected weight of liquid color is at the weigh station. The method further includes providing the serially metered solid materials and the pre-selected weight of liquid color material unitarily to a mixing station. The method further embraces mixing the unitarily supplied serially metered solid granular materials and a pre-selected weight of liquid color into a blend preparatory to manufacturing processing via molding or extrusion.

The monitoring is preferably performed continuously and digitally.

The metering of liquid color is preferably performed peristaltically.

In another of its aspects the invention may provide spring-loaded solenoid valve means for actuating the means for releasing material within the hopper, preferably by applying pneumatic pressure to a piston associated with the hopper material releasing means.

The weigh scale blender may further include means for enclosing the solenoid valve means thereby preventing finger actuation of the solenoid valve means. The weigh scale blender may yet further include manually controlled means, adapted for passage through the enclosure means, for overriding the solenoid valve means to result in application of pneumatic pressure to the piston of the hopper material releasing means thereby releasing any material within the hopper and permitting gravity induced flow thereof.

The spring-loaded solenoid valve means for actuating the means for releasing material within the hopper by applying pneumatic pressure to a piston of the hopper material releasing means may include a pressurized air manifold, conduits pneumatically communicating with respective sides of the piston and valve means including a movable stem defining a portion of the valve exterior, for selectably connecting the conduits to the manifold, thereby to move the piston in a selected direction and hence the associated material releasing means between open and closed positions.

There may further be provided a spring for biasing the stem of the valve means towards the position at which the material releasing means is closed. The means enclosing the solenoid valve means for preventing finger actuation thereof may comprise a block, preferably having an internal bore therewithin. The bore is preferably aligned with the stem of the valve. An external surface of the block preferably includes an aperture defining an end of the bore which is sufficiently proximate to the valve means to preclude digital or finger actuation of the valve by contact with the valve stem.

In another of its aspects, the weigh scale blender may include axially self-aligning means for coupling the motor to the mixing means.

Respecting the axially self-aligning means for coupling the motor to the mixing means, the self-aligning coupling means may preferably further include a cylindrical female member having an axially facing central bore formed therein. In such case, the annular female member further preferably includes a pair of retractable pins preferably extending from the end of the member and being adapted for mating connection with the male member.

The male member is preferably cylindrical and preferably has an annular plug extending axially therefrom. The plug preferably includes an axially tapered tip adapted for preferably complemental engagement with the preferably axially tapered wall of the female member bore. The plug further preferably includes a cylindrical wall intermediate the tip portion and the male member.

The male member preferably further includes bores formed therewithin for receipt of the retractable pins when the plug is within the female member bore and the axially tapered annular and cylindrical walls of the male and female members are in preferably respective complementally contacting engagement.

In another of aspects this invention provides a weigh scale blender having a frame, a weigh bin, means connected to the frame for sensing weight of the bin and any material contained therein, a mix chamber below the bin and connected to the frame with mixing means within the mix chamber, means for selectably releasing material in the weigh bin downwardly into the mix chamber with means connecting the weight sensing means to the frame and damping transfer of vibration and shock motion therebetween. The connecting means damping transfer of vibration and shock motion between the frame and the sensing means is elastomeric and is most preferably rubber.

In a yet further aspect of the invention the connecting means which damps transfer of vibration and shock motion between the weight sensing means and the frame includes an elastomeric member interposed between the frame and the weight sensing means. This elastomeric member is preferably annularly disposed about a shaft mutually received by the frame and the mounting portion of the weight sensing means.

BRIEF DESCRIPTION OF THE DRAWINGS

FIG. 4 is a front view of part of a male member portion of axially self-aligning means for coupling a motor to a mixer in the weigh scale blender illustrated in FIG. 1.

FIG. 5 is a side view of the part of the male member of the coupling means illustrated in FIG. 4 with certain of the hidden lines, which would otherwise be present, removed for drawing clarity.

FIG. 6 is a view analogous to that of FIG. 4, illustrating a female portion of the coupling means in a front view.

FIG. 7 is a side view of the female portion illustrated in FIG. 6.

FIG. 8 is a front view of a plug portion of the male member of the coupling means.

FIG. 9 is a side view of the plug portion illustrated in FIG. 8.

FIG. 10 is a side view of a pin adapted to fit in and extend from the female portion of the coupling means illustrated generally in FIGS. 6 and 7.

DESCRIPTION OF THE PREFERRED EMBODIMENT AND BEST MODE KNOWN FOR PRACTICING THE INVENTION

Figure 1:
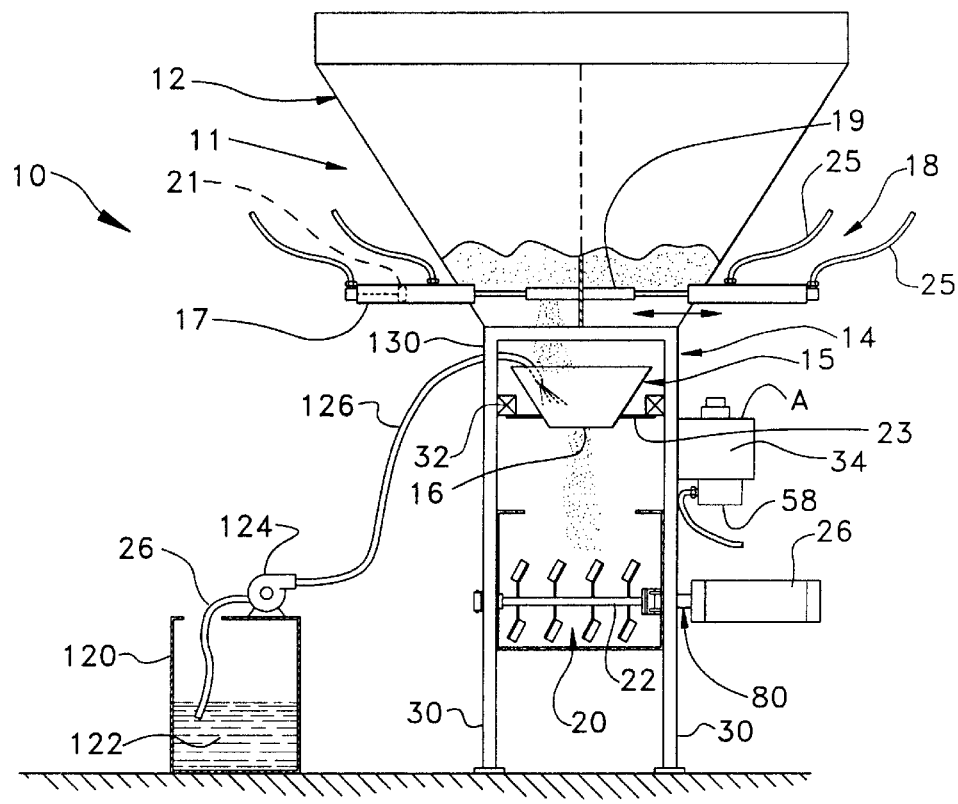
FIG. 1 is a side elevation of a weigh scale blender with a liquid color pump.

Referring to the drawings and to FIG. 1 in particular, a weigh scale blender together with a color addition pump are illustrated with this combination being indicated generally 10.

The weigh scale blender is designated generally 11 and includes a hopper, designated generally 12, supported by a frame designated generally 14 which holds a weigh bin 15 into which portions of plastic resin material, and optionally liquid color material, can be metered and weighed prior to release into a mix chamber as described below. Frame 14 preferably includes four upstanding members, which are preferably steel angle iron and are identified 30 with two of upstanding members 30 being illustrated in FIG. 1. Frame 14 preferably further includes webs connecting upstanding members 30 together to provide rigidity for frame 14. These webs have not been illustrated in the drawings.

Hopper 12 preferably has multiple internal compartments so that a plurality of different solid resinous materials may be dispensed from hopper 12 into weigh bin 15 by suitable slide gates, designated generally 19, located at the bottom of a given compartment of hopper 12.

Weigh scale blender 11 may further include pneumatically actuated piston means 21, housed within cylinders 17, which are connected with hopper 12 via slide gates 19. Piston means 21 operate in response to signals to move slide gates 19 thereby to release material stored within hopper 12 downwardly towards weigh bin 15. The pneumatic piston-cylinder actuated slide gate combinations are designated generally 18 in FIG. 1.

Alternatively, one or more auger feeders may be used in lieu of a portion of hopper 12. Auger feeders are desirably used for components which are added at 5% or less to the mix blend; however, auger feeders add to the cycle time for each batch and reduce overall throughput rates. Hence, auger feeders are desirably optionally used only for addition of low percentage components to the blend to be mixed.

Positioned within and preferably slidably retained in place by frame 14 below weigh bin 15 is a mix chamber 20 having a mixing means which is preferably in the form of a mixing agitator 22 rotatably disposed therewithin. Agitator 22 is mounted for rotation about an axis 24 preferably shared with a drive motor 26. Motor 26 preferably has its drive shaft positioned to drive mixing agitator 22 about a common axis. Drive motor 26 is preferably supported by a cantilevered support, which has not been illustrated in the drawing for clarity, extending laterally from an upstanding member 30 of frame 14.

While the weigh scale blender illustrated in FIG. 1 has been depicted showing a single rotatable mixing means 22, two mixers, one desirably located above the other, may also be used for high volume applications. Mix chamber 20 may be fabricated to be slidably removable from frame 14 with mix chamber 20 being movable in a direction parallel with the axis of agitator 22.

Desirably located proximate to weigh scale blender 11 as illustrated in FIG. 1 is an optional liquid color reservoir 120 having liquid color therein denoted 122. A pump 124 is desirably a peristaltic pump or perhaps a progressive pump or a piston pump and connects to liquid color reservoir 120 to draw liquid color 122 from reservoir 120 by a pump color feed line 126. Pump 124 preferably provides liquid color to weigh scale blender 11 via mixer color feed line 128. This line connects to frame 14 of weigh scale blender 11 via tube holding fitment 130 through which liquid color material 122 is introduced to the upper portion of weigh bin 15 of weigh scale blender 11.

Pump 124 is desirably mounted at least close to, and preferably on, optional liquid color reservoir 120, as illustrated in FIG. 1. Such location and mounting of pump 124 close to and desirably on top of reservoir 120 is necessitated by the nature of the liquid color 122 in reservoir 120. Specifically, liquid color 122 is typically extremely thick and viscous. Liquid color material 122 can be pumped using positive pressure a much longer distance than the liquid color material 122 can be drawn by suction or vacuum.

Pumping using pump 124 may produce pressures of up to 100 pounds per square inch. Suction, even if a full vacuum is achieved, relies on air pressure to move liquid and hence the maximum possible pressure is about 14.7 psi. Accordingly, it is important to locate pump 124 close to reservoir 120 in order that most efficient delivery of liquid color 122 to weigh scale blender 11 may be effectuated. Suitable pumps for use as liquid color pump 124 are available from Maguire Products, Inc. in Media, Pa.

Weight of material in weigh bin 15 is preferably sensed by load cells 32 which are preferably connected to microprocessor control means 34 which regulates operation of the weigh scale blender 11 through electrical connection with the load cells, the solenoid actuators for the solenoid valves, the motor, the liquid color pump and the like.

The microprocessor provides control of weigh scale blender 11 by monitoring, preferably on a continuous basis, weight of material, if any, at a weighing station defined by weigh bin 15. By sensing weight of weigh bin 15 and opening appropriate slide gates 19, microprocessor control means 34 serially meters respective components of solid granular resinous material to the weighing station defined by weigh bin 15 until a pre-selected weight of each of the respective components has arrived at the weigh station.

Microprocessor 34, through monitoring weight of the weigh bin and material therewith, optionally controls metering liquid color to the weighing station defined by weigh bin 15 and adds the metered liquid color to the respective components of solid granular material at the weigh station until a pre-selected weight of liquid color has arrived at the weigh station and has been added to the batch of solid material defined by the collective components in weigh bin 15.

Blender 11 preferably operates by blending components by weight based on settings which are preferably shown on a master controller portion of microprocessor controller 34. Blending is desirably done in batches of 2,000, 4,000, 9,000 or 18,000 grams, depending on the amount desired. Each component is preferably dispensed separately into weigh bin 15 and then all components are dropped together into mixing chamber 20.

Blender 11 is designed to mount directly over the feed throat of a process machine used to mold or extrude plastic material with blender 11 being bolted or otherwise fixedly connected to the process machine.

When exclusively solid materials are being blended, typically regrind material is dispensed first according to the percent of regrind material required. If no regrind material or a limited amount of regrind material is present, then portions of natural material, solid color material and additive material are increased to bring about a full batch weight. Natural material is typically added second. The amount of natural material added is preferably calculated by microprocessor 34 to leave exactly the right amount of room in the mix chamber for the solid color material and additive material. Once the natural material fill portion of the cycle has been completed, the exact weight of the natural material that has been actually dispensed is determined to detect any errors. Based on this actual weight of natural material dispense, color additive in the form of solid color additive material is metered into the weigh bin and then other solid additive materials are metered into the weigh bin in the same manner. All components are then dumped into the mixing chamber which is preferably continuously running.

In the case where liquid color material is used in place of solid color material, the liquid color material is preferably added to the weigh bin last.

Microprocessor control means 34 provides the serially metered components and the optional preselected weight of liquid color material unitarily to a mixing station defined by mix chamber 20 by opening weigh bin 15 thereby to permit the materials vertically supported thereby to fall downwardly into the mix chamber. Weigh bin 15 is preferably opened by a pneumatic piston-cylinder combination, which is controlled by microprocessor 34 and has not been illustrated in the drawings for drawing clarity. The pneumatic piston-cylinder combination is mounted on frame 14 and is connected to weigh bin 15 so that weigh bin 15 opens responsively to movement of the piston member of the piston-cylinder combination.

In mix chamber 20 the solid material components which have been preferably unitarily supplied and serially metered to weigh bin 15, and optionally a pre-selected weight of liquid color material, are mixed into a blend preparatory to being supplied to the manufacturing processing machine such as a molding press or an extrusion machine.

When the optional liquid color is introduced to the material to be blended in weigh bin 15 and has been dropped into mix chamber 20, the mixer portion, specifically mixing agitator 22 of weigh scale blender 11, effectively precoats the material pellets, which have come from hopper 12 through weigh bin 15 into mix chamber 20, with the liquid color. This produces superior color dispersion in final production parts produced by injection or compression molding or by extrusion, providing a substantial improvement over results achieved when liquid color material is blended with plastic resin by metering liquid color directly into the throats of plastic material processing machines such as extruders and molding presses. Supplying liquid color 122 to weigh bin 15 of weigh scale blender 11 using pump 124 permits accurate computerized tracking of liquid color material used.

Liquid color 122 by its very nature presents a continuous potential for substantial clean-up difficulties in the event of a spill, malfunction of equipment or breakage of any of the feed lines such as pump color feed line 126 or mixer color feed line 128. Providing liquid color 122 directly into weigh bin 15 of weigh scale blender 11 provides a practical means of handling liquid color 122 and minimizes clean-up problems in the event of equipment failure.

Desirably, monitoring of weight of material at the weighing station is performed continuously by the microprocessor continuously digitally sensing signals supplied by load cells which are depicted schematically in FIG. 1 and identified generally 32 therein; the load cells are interposed between weigh bin 15 and frame 14. Weigh bin 15 is suspended by and from load cells 32 with respect to frame 14. Depending on the size of weigh bin 15, a single load cell or multiple load cells may be used.

Most desirably metering of liquid color to the weighing station defined by weigh bin 15 is performed peristaltically.

Figure 2:
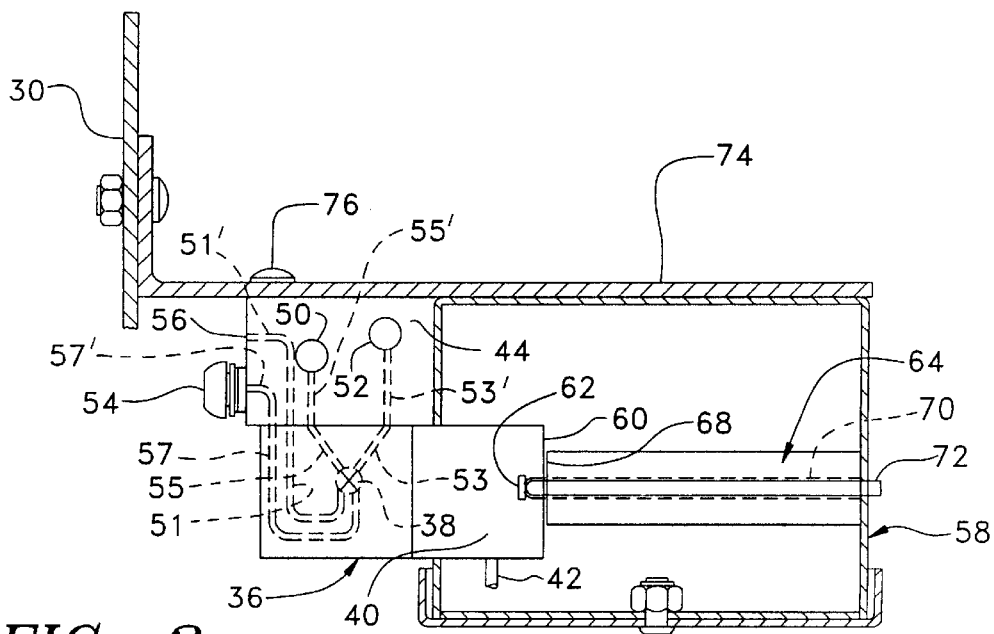
FIG. 2 is a side sectional view of apparatus enclosing solenoid valve means and preventing finger actuation thereof which may be provided as a portion of the weigh scale blender illustrated in FIG. 1.
Figure 3:
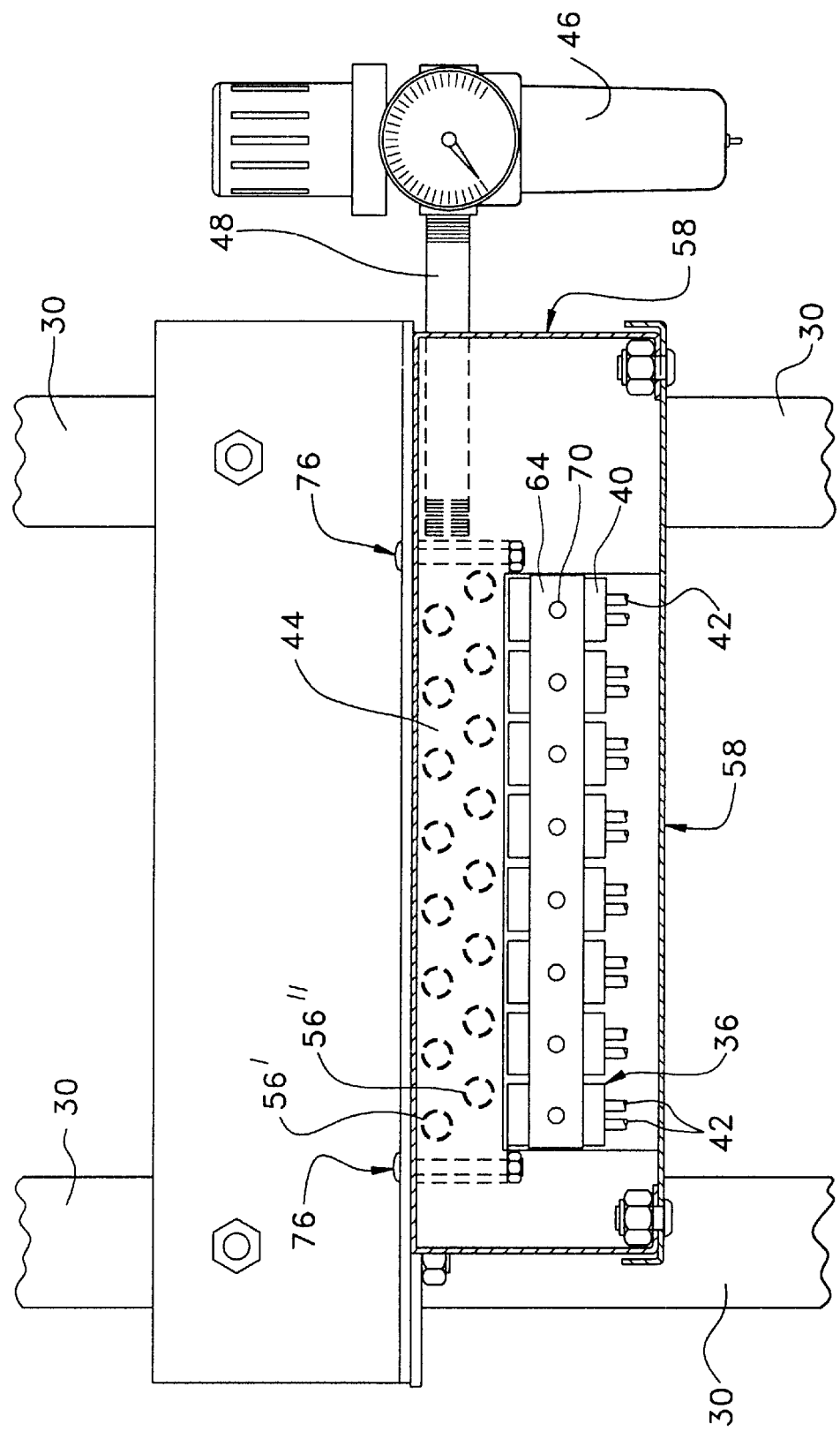
FIG. 3 is a view of the apparatus illustrated in FIG. 2 taken looking from the right side in FIG. 2.

Microprocessor control means 34 actuates solenoid controlled preferably pneumatic valves, which are not illustrated in FIG. 1 but which are shown schematically as 36 in FIGS. 2 and 3, to provide pneumatic pressure via suitable conduits to piston-cylinder slide gate combinations 18. Solenoid valves 36 actuated by control means 34 are each individually connected via two suitable conduits, which are preferably flexible plastic tubing, to associated individual piston-cylinder slide gate combinations 18 to open and close individual slide gates 19 by application of pneumatic pressure to an appropriate side of a piston 21 portion of a piston-cylinder combination 17.

Each solenoid valve 36, specifically the core of the solenoid, is spring-biased towards a position corresponding to that at which the piston member 21 of a piston-cylinder slide gate combination 18 associated with a given solenoid valve 36 is at a preferred position, referred to as the default position, for operation of weigh scale blender 11. When due to a change in operational factors such as removal of a blended batch from mix chamber 20, need for additional material in weigh bin 32, commencement of a loading cycle or the like, microprocessor control means 34 senses that it is required to actuate a given piston of a piston-cylinder slide gate combination 18. One example might be to open one of the compartments within hopper 12 to add an amount of component material in that compartment to weigh bin 15. In such case microprocessor control means 34 actuates the solenoid valve associated with the given piston-cylinder slide gate combination of interest thereby moving the piston member of the appropriate piston-cylinder slide gate combination 18 from the default position to a position at which a given hopper slide gate is open or other desired action has been taken.

Referring to FIG. 2, each solenoid valve, one of which has been designated generally 36, includes a valve member 38 and a solenoid actuator 40, both of which have been shown in schematic form in FIG. 2. Suitable wiring, which has been designated 42 in FIG. 2, leads from solenoid actuator 40 to microprocessor control means 34, which has not been illustrated in FIG. 2.

Each solenoid actuator 40 includes a core member, not illustrated in FIG. 2, which when actuated due to voltage being applied to an associated coil, moves axially respecting the coil and actuates associated valve member 38 against the bias of a spring, also not illustrated in FIG. 2, which continuously urges the core towards the default position.

The solenoid actuated valves function to move pistons within air cylinders by pressurizing one side of a piston and opening the other side to the atmosphere. There is no vacuum involved, just pressure above atmospheric pressure and ambient atmospheric pressure.

Valves 36 are preferably four-way solenoid valves, meaning that each valve has four ports. These are a pressure port, an exhaust port and two function ports which are connected to the given air cylinder of interest by the flexible plastic tubing. The pressure and exhaust ports are connected to air pressure and ambient atmosphere respectively by way of a manifold 44 which is drilled to provide common pressure and exhaust ports for all of the solenoid actuated valves.

The valve in its normally at rest or default state connects pressurized air to an "A" port and ambient air to a "B" port. When the valve is energized the A port is switched to ambient air and the B port is switched to the pressurized air. Two air lines 25 preferably connect each solenoid actuated valve to a given air cylinder with one solenoid actuated valve being provided for and connected to each air cylinder. At rest or default, a piston 21 within a given air cylinder 17 is preferably extended so that the slide gate actuated by piston 21 is closed. When the associated valve 36 is energized, piston 21 retracts, the associated slide gate 19 opens and material in the hopper is dispensed downwardly.

Solenoid actuated valves 36 may also be used to operate the weigh bin dump and further may be used to operate an optionally flow control valve serving the shutoff and exit opening at the bottom of the blender. If the blender is fitted with such a flow control at the bottom, the flow control valve may hold material in the chamber for a time period for better mixing.

Each solenoid valve 36 preferably has associated therewith a pair of pneumatic conduits, each of which is connected to manifold 44 as illustrated in FIG. 2. One of the pneumatic conduits preferably leads to a pressurized air inlet portion of manifold 44 where the air inlet or a pressurized portion of manifold 44 has been designated 50 and is illustrated as a conduit extending longitudinally through manifold 44. Similarly, a second one of pneumatic conduits associated with a given solenoid valve 36 is an unpressurized, ambient air conduit and communicates with an exhaust portion of manifold 44 where the exhaust portion has been designated 52 in FIG. 2 and has similarly been illustrated as a conduit extending longitudinally through manifold 44.

Valve 38 operates to connect either positive air pressure, as received by pneumatic conduit 55 communicating with pressurized air inlet 50 or ambient pressure as present in pneumatic conduit 53 communicating with the exhaust or ambient portion 52 of manifold 44 to default and signal conduits 51, 57 respectively as illustrated in FIG. 2. Apertures formed in manifold 44 define open ends of the respective pressurized and ambient conduits 51', 57'which communicate with corresponding pressurized and ambient conduits 51', 57' of valve 36 with apertures 56', 56' defining outlets of conduits 51', 57' from manifold 44 as shown in FIG. 3. One of apertures 56', 56'; has been illustrated with a fitting 54 in FIG. 2. Use of the prime notation in this paragraph serves to distinguish portions of conduits 51', 53', 55' and 57' formed in manifold 44 from the portions of those corresponding conduits forming a part of a respective solenoid valve 36.

Solenoid valves 36 and especially solenoid actuators 40 of valves 36 are preferably maintained within an enclosed housing designated generally 58 in FIG. 2. Housing 58 is preferably of sheet metal construction and, as illustrated in FIG. 2, can be constructed from multiple pieces secured together by nut and bolt combinations, by sheet metal screws or by other means. Closed housing 58 preferably fits around solenoid actuators 40 and specifically preferably encloses face surfaces 60 of solenoid actuators 40 in which or from which the movable core of the solenoid portion of solenoid valve 36 may be accessed. In FIG. 2, the solenoid core and specifically the tip portion thereof of valve 36 has been illustrated schematically as 62.

Retained within closed housing 58 is a block 64 which includes bores 66 therein. Block 64 is fabricated of a size and positioned within housing 58 so as to have a planar surface 68 which is in close proximity and preferably in facing complemental contact with all of faces 60 of solenoid actuators 40 via which the core members 62 of given solenoid valves 36 may be accessed.

Block 64 is retained rigidly and fixedly within closed housing 58 and positioned with bore 66 communicating with tip 62 of the movable solenoid core. Due to the close placement of face 68 in preferably essentially complemental, and in any event close proximity to, and parallel disposition with face 60, block 64 makes tip 62 of the solenoid core effectively inaccessible by an operator's fingers. Block 64 is preferably constructed of sufficient size to adequately overlap the area or aperture, as illustrated in FIG. 2, within which or via which tip 62 of a movable solenoid core may be accessed. Block 64 is preferably fabricated from a solid piece of aluminum or other metal or of plastic.

Push rods 70 may be provided within bore 66 for manual actuation of solenoid core tips 62 by manually pushing on a remote end of A rod 70, denoted 72 in FIG. 2.

In jurisdictions where safety regulations prohibit manual actuation of solenoid valves, manual override of pneumatically actuated solenoid valves 36, rods 70 would not be present. In such case, due to the presence of block 64 override of solenoid valves 36 could only be accomplished using a suitable secured tool, thereby preventing direct manual actuation and override of a solenoid valve 36.

Preferably manifold 44, solenoid valves 36, closed housing 58 and the associated structure are mounted on the bottom side of a housing for microprocessor 34, which is provided in cantilevered fashion extending from upstanding members 30 of frame 14, as illustrated in FIG. 2. Manifold 44, associated solenoid valves 36, closed housing 58 and the structure enclosed therewithin may be secured to the bottom of the housing for microprocessor 34 which has been designated 74 in FIG. 2 via suitable bolt and nut combinations 76, as illustrated in FIGS. 2 and 3.

Referring to FIGS. 4 and 5 of the drawings, the axially self-aligning means, designated generally 80 in FIG. 1, for coupling drive motor 26 to mixing agitator 22 preferably includes male and female portions where the component parts of the female portion are illustrated in FIGS. 6, 7 and 10 and the component parts of the male portion are illustrated in FIGS. 4, 5, 8 and 9.

Axially self-aligning means 80 for coupling motor 26 to mixing means 22 preferably has a female portion which is preferably generally cylindrical in shape and has been designated generally 78 in FIGS. 6 and 7. The coupling apparatus itself is designated generally 80, and is illustrated in schematic form in FIG. 1.

Figure 11:
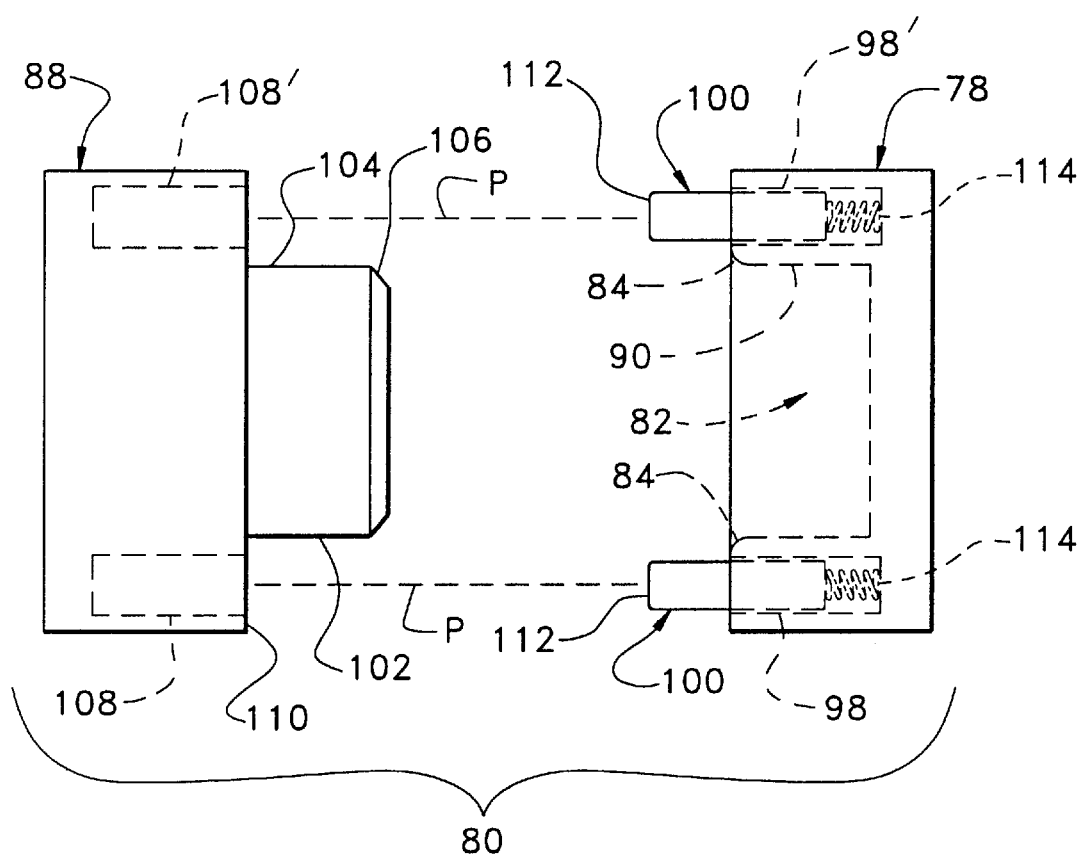
FIG. 11 is a side schematic view of axially self-aligning means for coupling a motor to a mixer in the weigh scale blender illustrated in FIG. 1, showing the component parts illustrated in FIGS. 4 through 10 assembled and ready for coupling of the male and female members together.

Female member 78 preferably has an axially facing central bore 82 formed therein as illustrated in FIG. 7. Bore 82 preferably includes an axially tapered annular wall 84 which communicates with an end 86 of preferably cylindrical female member 78. End 86 is preferably in the form of a planar, preferably annular surface and is adapted for mating connection with a male member 88, illustrated in FIGS. 4 and 5, of axially self-aligning coupling means 80. The manner in which female member 78 matingly connects with male member 88 to assure axial alignment of coupling means 80 is illustrated in FIG. 11.

Female member 78 further includes a cylindrical wall 90 forming a portion of axially facing central bore 82. Wall 90 adjoins axially tapered annular wall 84 at one extremity thereof and adjoins an annular bottom 92 of central bore 82 at a second axial extremity. Axially facing central bore 82 extends entirely through female member 78 as a portion of reduced diameter indicated as 94 in FIG. 7; the reduced diameter portion 94 of axially facing central bore 82 has not been illustrated in FIG. 11 to facilitate drawing clarity and understanding of the operation of axially self-aligning coupling means 80.

Female member 82 may be retained in place on the shaft of drive motor 26 or on the shaft of mixing agitator 22 by keying the selected shaft together with a set screw, for which mating threads and a suitable receiving bore have been illustrated in FIG. 6. The keyed arrangement in the reduced diameter portion 94 of bore 82 of female member 78 is illustrated in FIG. 6. The keyway, which has not been numbered, has been illustrated in dotted lines in FIG. 7. The set screw and threaded bore for the set screw, illustrated generally in FIG. 6, have been omitted from FIG. 7, and from FIG. 11, to aid drawing clarity.

Female member 78 further preferably includes a pair of closed bottom bores 98, 98', which are preferably disposed diametrically opposite from one another and formed in facing surface 86 of female member 84 at a position outboard of the outer extremity of axially tapered annular wall 84 in such surface. Closed bottom bores 98 are provided to house spring-loaded pins 100, one of which has been illustrated in FIG. 10. Pins 100 are preferably spring-loaded against the bottom of closed bottom bores 98 to protrude from surface 86 towards male member 88. Pins 100 are biased outwardly from bottoms of closed bottom bores 98 by springs 114 which are preferably fitted within and extend from pins 100 as illustrated generally in FIGS. 10 and 11.

As illustrated in FIGS. 4, 5 and 11 male member 88 is generally cylindrical in form and has an annular plug 102 extending therefrom where the plug has been illustrated in FIGS. 8 and 9. Plug 102 is preferably manufactured from a thermoplastic material such as those sold under the trademarks Nylon, Delrin and Celcon. Plug 102 preferably includes a cylindrical portion 104 and an axially tapered portion 106. Cylindrical portion 104 is preferably sized for close complemental fitting with cylindrical wall 90 of axially facing central bore 82 in female member 78. Tapered portion 106 is preferably tapered at the same angle relative to the axis as axially tapered annular wall 84 of axially facing central bore 82 in cylindrical female member 78. Plug 102 is preferably held in place at the center of cylindrical male member 88 by suitable set screws, machine screws and the like which have not been illustrated in the drawings.

Cylindrical male member 88 further preferably includes a pair of diametrically opposed bores 108, 108' which are spaced away from the axis of male member and positioned to receive spring-loaded pins 100 protruding from closed bottom bores 98 of cylindrical female member 78 of coupling member 80. The receipt of spring-loaded pins 100 extending from female member 78 by diametrically opposed bores 108, 108' formed in male member 88 is depicted schematically by dotted lines P in FIG. 11. When cylindrical female member, specifically surface 86 thereof, is sufficiently proximate to facing surface 110 of cylindrical male member 88 that retractable pins 100, protruding from closed bottom bores 98, engage bores 108 in cylindrical male member 88 as depicted by dotted lines P, tight coupling with essentially no rotational play between male and female members 88, 78 is effectuated.

As illustrated in FIG. 11 the coupling member 80 of which principal components are illustrated in FIGS. 4 through 10 is axially self-aligning due to the configuration of plug 102, specifically the wall profile thereof which is initially tapered and thereafter cylindrical. When initial tapered portion 106 of plug 102 encounters the correspondingly tapered portion defined by axially tapered annular wall 84 in female portion 78, the taper between the two surfaces, specifically upon contact therebetween, causes male and female coupling members 78, 88 to axially align, thereby providing a self-aligning coupling which is effectuated as pins 100 protruding from closed bottom bores 98 find bores 108 in face 110 and extend thereinto. Engagement of pins 100 and bores 108 provides excellent torque transfer between male and female members 88, 78 constituting axially self-aligning torque coupling 80.

Spring loading of pins 100, as the male and female members of coupling assembly 80 approach one another and surfaces 86, 110 become proximate one another, permits those pins to retract slightly into closed bottom bores 98 as the extremities 112 of the pins protruding from bores 98 contact surface 110. Hence any destructive forces are ameliorated as pins 100, specifically outermost surfaces 112 thereof, contact surface 110 and run on surface 110 due to relative rotation between the male and female members until pins 100 find bores 108, 108' and extend thereinto, thereby effectuating tight connection between the male and female members of axially self-aligning coupling means 80.

Figures 12, 13:
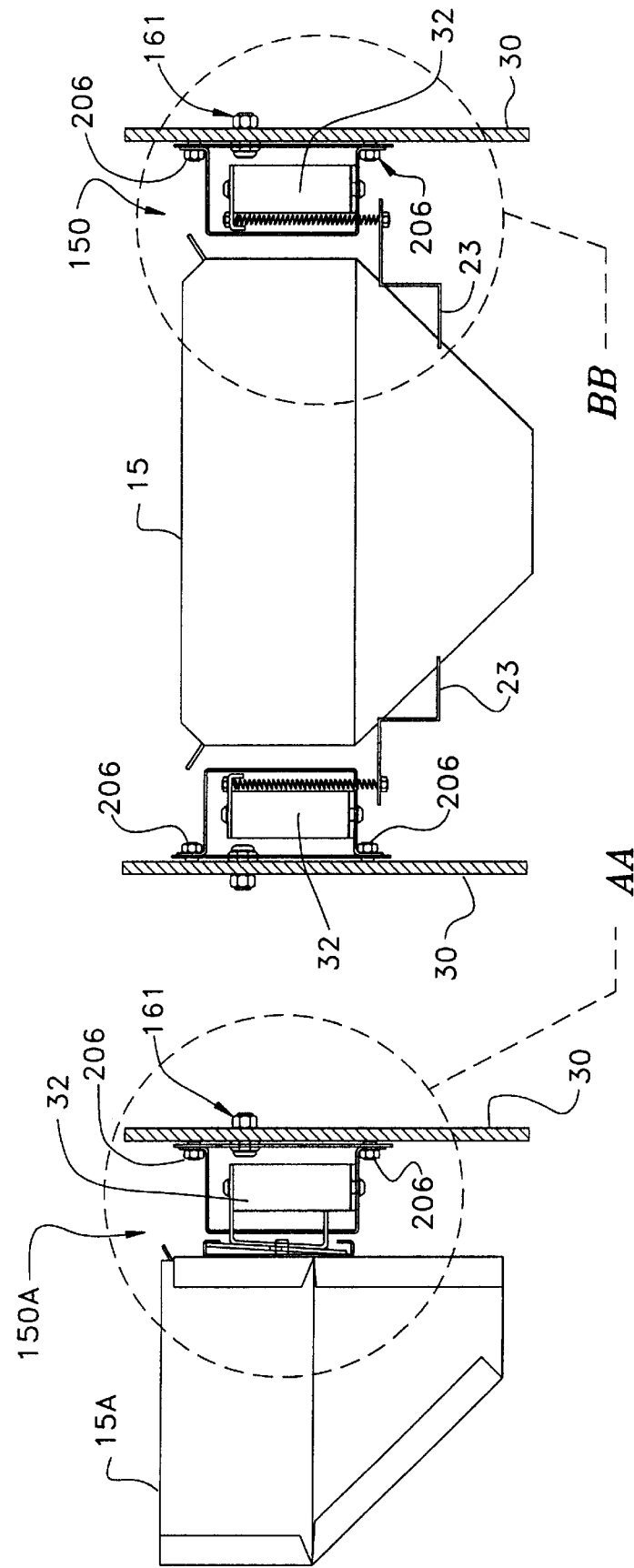
FIG. 12 is a side view of a load cell and associated structure connecting a weigh bin to a frame of a weigh scale blender including means for shock and vibration isolating the load cell from the frame, where the weigh scale blender employs a single load cell.
FIG. 13 is a side view of a load cell and associated structure connecting a weigh bin to a frame of a weigh scale blender including means for shock and vibration isolating the load cell from the frame, where the weigh scale blender employs two load cells.

FIG. 12 illustrates a portion of a single load cell embodiment of the invention including means for connecting the load cell to frame 14 of weigh scale blender 11 for damping transfer of vibration and shock motion between frame member 30 and load cell 32. In the single load cell embodiment the means for connecting the load cell to the frame of the weigh scale blender includes structure for connecting the weigh bin 15 to the load cell 32 preferably in a manner that weigh bin 15A is effectively cantilevered from load cell 32.

FIG. 13 illustrates a portion of a dual load cell weigh scale blender including means connecting the load cells to frame 14 of weigh scale blender 11 and damping transfer of vibration and shock motion therebetween. In the dual load cell embodiment weigh bin 15 is preferably supported by and preferably rests directly on a pair of brackets, which are generally of zig-zag shape and are designated generally 23 in FIG. 13. Weigh bin 15 preferably rests directly on brackets 23 which transfer weight of weigh bin 15 and any material contained there into load cells 32.

Figure 14:
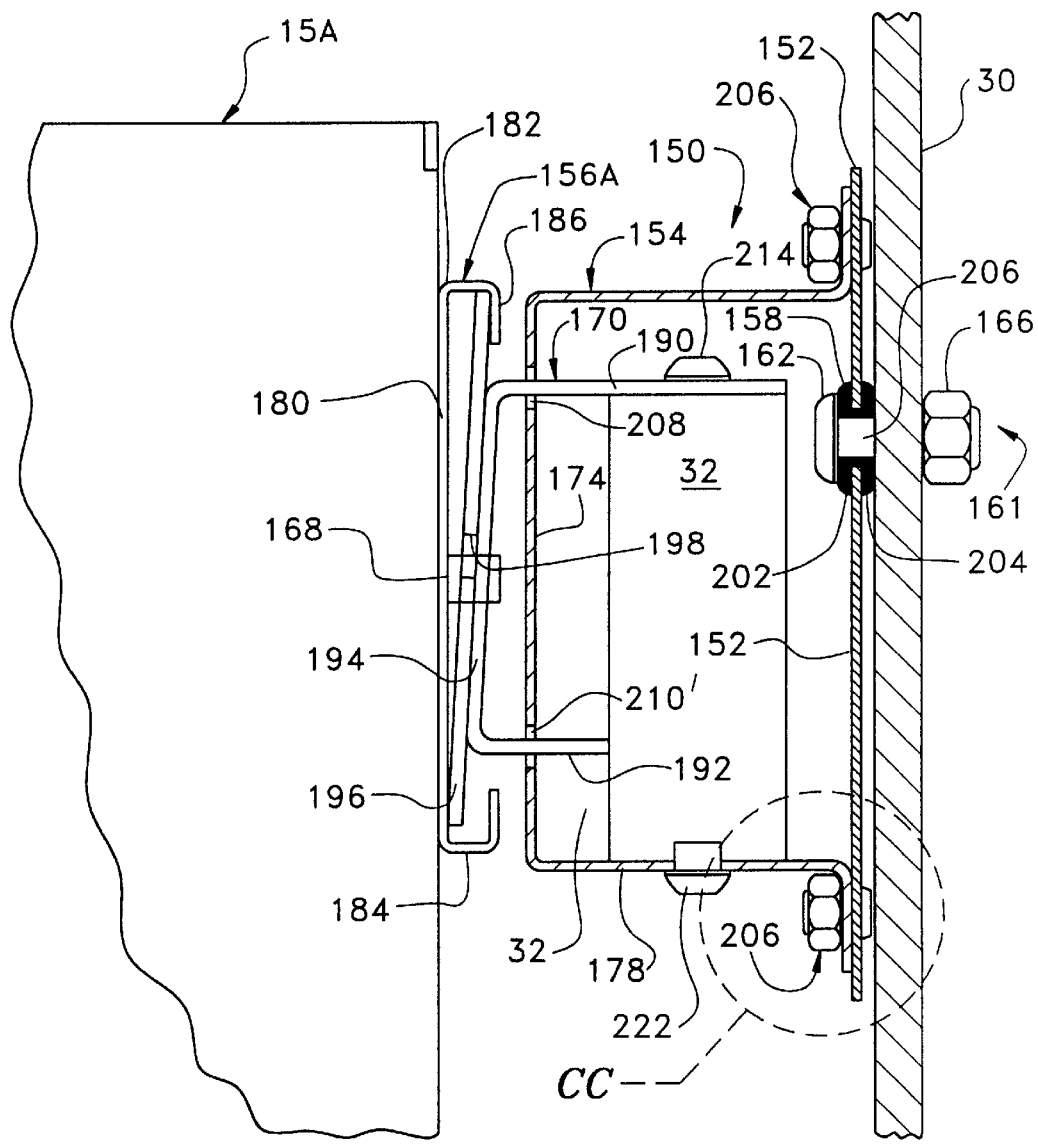
FIG. 14 is an enlarged view of the structure illustrated in FIG. 12 as indicated by circle AA in FIG. 12.

As illustrated in FIG. 14 which is an enlarged version of the structure illustrated in circle AA in FIG. 12, load cell 32 is mounted on and contained within a load cell enclosure box designated generally 154.

Box 154 has a vertically upstanding portion 174 and upper and lower horizontally extending portions 176 and 178 respectively.

The weigh bin has been designated 15A in FIG. 14, with the letter "A" denoting that the weigh scale blender has but a single load cell 32.

The weigh scale blender illustrated in FIG. 1 has two load cells 32. Larger capacity weigh scale blenders are provided with two load cells whereas smaller capacity weigh scale blenders utilize only a single load cell, for economy purposes.

Referring still to FIG. 14 there is connected to weigh bin 15A a weigh bin bracket 156A which is fixedly secured to weigh bin 15A. Weigh bin bracket 156A includes a vertically extending portion designated 180 in FIG. 14, which is preferably fixed in facing complemental contact with weigh bin 15A.

A portion 182 of weigh bin bracket 156 extends horizontally outwardly from vertical portion 180 of the weigh bin bracket at the upper extremity thereof while a corresponding horizontally extending portion 184 extends laterally outwardly, in a horizontal direction, from the lower extremity of vertical portion 180 of the weigh bin bracket as illustrated in FIG. 14. An upper outer extremity of weigh bin bracket 156 extends vertically downwardly from an outboard extremity of horizontally extending portion 182; this vertically downwardly extending portion of bracket 156 is designated 186 in FIG. 14. A corresponding lower vertically upwardly extending portion of weigh bin bracket 156 is designated 188 in FIG. 14 and extends vertically upwardly from the lateral outward extremity of horizontally extending portion 184 of weigh bin bracket 156.

Vertically extending extremities 186, 188 provide an open envelope structure which permits weigh bin 15A and particularly weigh bin bracket 156 to move slidably horizontally, in a direction perpendicular to the plane of the paper in FIG. 14, to be positioned so that weigh bin 15A effectively hangs on and is cantilevered from load cell 32.

Affixed to load cell 32 for receiving the weight load and transferring the same to load cell 32 is a load transfer beam 170. Load transfer beam 170 has an upper horizontally extending portion 190 fixedly connected by screw 214 to the upper surface of load cell 32, a lower generally horizontally extending portion 192 and a central portion 194 extending between upper and lower portions 190, 192 and slightly canted from the vertical illustrated in FIG. 14. Load cell 32 senses the weight load of weigh bin 15A and any material contained therein by strain resulting at the upper surface of load cell 32 where load transfer beam 170 is fixedly connected thereto. Load cell 32 is fixed to load cell enclosure box 154, particularly to lower horizontally extending portion 178 of load cell enclosure box 154 via suitable screws 222, only one of which is visible in FIG. 14.

Affixed to central portion 194 of load transfer beam 170 is a load transfer plate designated 196 in FIG. 14. Plate 196 is preferably slotted at the central portion thereof with the slot designated generally 198 in FIG. 14. Slot 198 is relatively short, preferably being only about 1 inch in length, and is provided to receive a tab member 168 which extends laterally from vertical portion 180 of weigh bin bracket 156, as weigh bin 15A is slidably positioned on and supported by load transfer plate 196. When weigh bin 15A is fully in position and tab 168 has traversed the relatively short length of slot 198, tab 168 disengages from slot 198 and the weigh pan moves slightly downwardly, with the upper interior of weigh bin bracket 156 coming to rest on the vertical upper extremity of load transfer plate 196. In this position weigh bin 15A is effectively cantilevered with respect to load cell 32 and the load represented by the weight of the weigh bin 15A and any material contained therein is transferred directly to load cell 32 by load transfer plate 196 and load transfer beam 170, with load cell 32 effectively sensing the weight of material contained within bin 15A.

Figure 15:
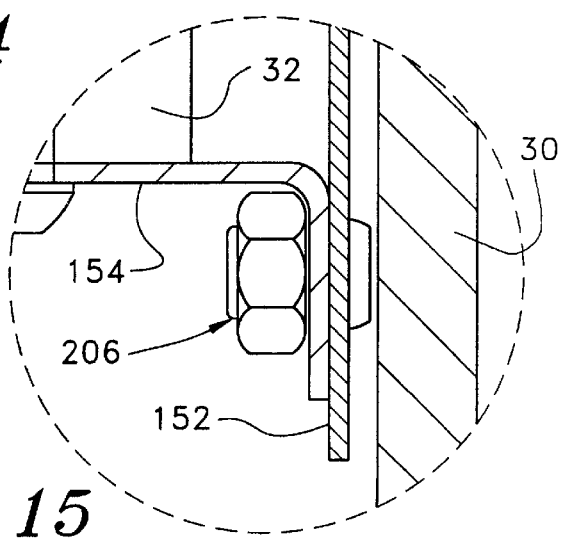
FIG. 15 is an enlarged view of the structure illustrated in FIGS. 12 and 14 taken at circle CC in FIG. 14.

To protect load cell 32 from contact and possible damage by operators, load cell 32 is preferably within load cell enclosure box 154 as illustrated in FIG. 14. Load cell enclosure box 154 is in turn preferably connected to a load cell mounting plate 152 by suitable nut and bolt combinations as illustrated in FIG. 14 and as shown in greater detail in FIG. 15. The nut and bolt combinations 206, which secure load cell enclosure box 154 to load cell mounting plate 152, are spaced away from and do not contact upstanding members 30 of frame 14. This is illustrated in FIG. 15.

Load cell 32 and particularly load cell 150 are connected to frame 14 and specifically to upstanding members 30 by load cell assembly 150 which desirably includes a plurality, preferably two, of mounting bolt/lock nut/grommet combinations, one of which has been designated generally 161 in FIG. 14. Mounting bolt or screw 162 extends through load cell mounting plate 152 via a suitable aperture formed therein and also through a suitable apertures in upstanding frame member 30. Mounting bolt on screw is retained in place by a lock nut 166. A rubber grommet 158 is positioned preferably in the hole through load cell mounting plate 152 such that there is no metal-to-metal contact between load cell mounting plate 152 and upstanding frame member 30. Rubber grommet 158 cushions load cell mounting plate 152 with respect to upstanding frame member 30.

Similarly, because rubber grommet 158 has two exterior donut-like portions, designated 200, 202 in FIG. 14, and an internal hollow cylindrical portion designated 204 in FIG. 14, there is no metal-to-metal contact between mounting screw or bolt 162 and load cell mounting plate 152. The soft rubber of grommet 158 cushions load cell mounting plate 152 against any contact and effectively shock and vibration isolates load cell mounting plate 152 from mounting screw or bolt 162 and hence from upstanding frame member 30.

Figures 18, 19:
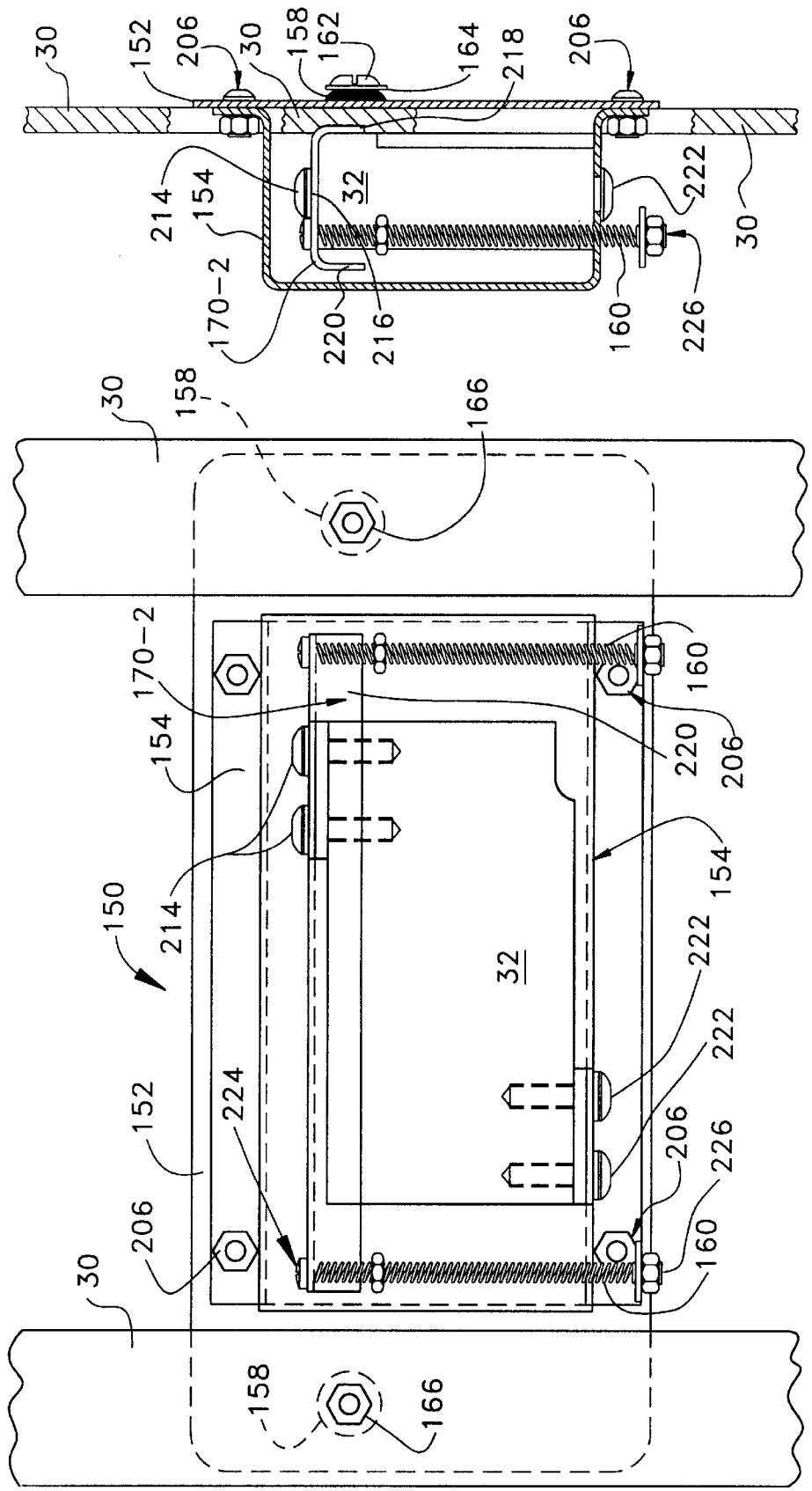
FIG. 18 is an enlarged view of the structure illustrated in FIG. 13 as indicated by circle BB in FIG. 13.
FIG. 19 is a side elevation of the load cell and associated structure illustrated in FIG. 18, looking from the right side in FIG. 18.

Referring to FIG. 19 where the mounting arrangement for a load cell 32 respecting upstanding frame members 30 in a two load cell weigh scale blender is illustrated, load cell mounting plate 152 is illustrated in FIG. 19 as is load cell enclosure box 154. From FIG. 19 it is immediately apparent that the mounting bolt/lock nut/grommet combinations 161, which secure load cell mounting plate 152 to upstanding frame members 30, preferably reside in apertures formed in load cell mounting plate 152 which are preferably well removed laterally from load cell 32.

As is further apparent from FIG. 19, nut and bolt combinations 206 which secure load cell enclosure box 154 to load cell mounting plate 152 also are preferably well removed laterally from upstanding frame members 30 and hence from mounting bolt/lock nut/grommet combinations 161.

As further illustrated in FIG. 19, load cell mounting plate 152 is preferably generally rectangular in configuration and forms what would otherwise be an open side of load cell enclosure box 154. Apertures are provided in load cell enclosure box 154 for passage therethrough of structure connecting the weigh bin to the load cell. In the embodiment illustrated in FIG. 14, openings in load cell enclosure box 154 and specifically in vertically upstanding portion 174 thereof are designated 208, 210 for passage of upper and lower generally horizontally extending portions 190, 192 of load transfer beam 170 therethrough.

Figure 16:
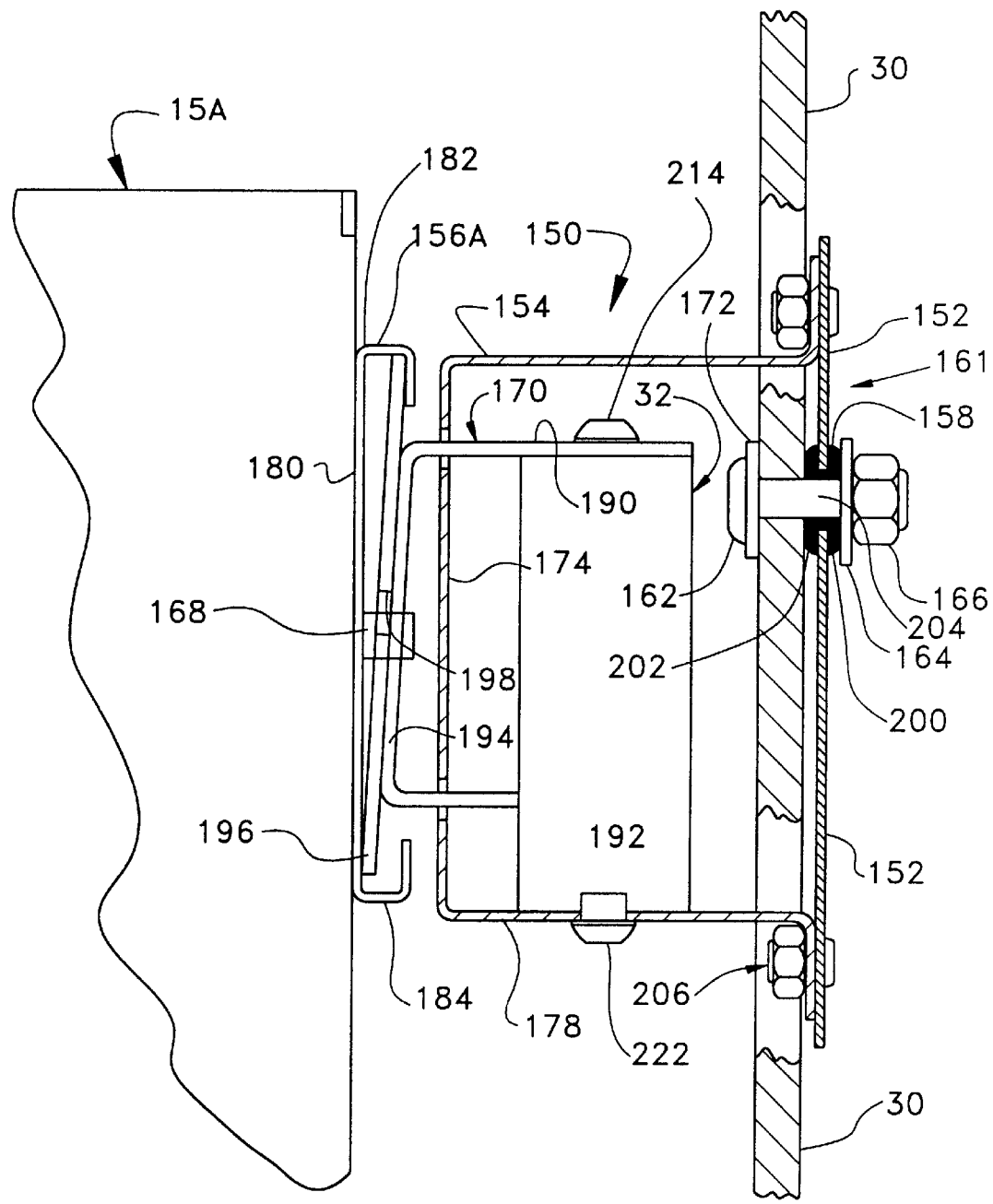
FIG. 16 is an enlarged broken side view of a load cell and associated structure, similar to FIG. 14, connecting a weigh bin to a frame of a weigh scale blender including means for shock and vibration isolating the load cell from the frame in accordance with a preferred embodiment of the invention for single load cell blenders.

FIG. 16 illustrates another embodiment of a load cell assembly designated generally 150. The embodiment illustrated in FIG. 16 is similar to that illustrated in FIG. 14 in that load cell 32 is located between upstanding members 30 of frame 14 and a weigh bin 15A, and is further similar to the structure illustrated in FIG. 14 in that weigh bin 15A is effectively cantilevered from load cell 32.

The structure illustrated in FIG. 16 differs from that illustrated in FIG. 14 in that load cell mounting plate 152 is positioned outboard of upstanding frame members 30. Load cell 32 is clearly inboard of frame members 30, between frame members 30 and weigh bin 15A. The mounting bolt/lock nut/grommet combination 161 is essentially the same as illustrated in FIG. 14; a washer 164 is provided in the structure illustrated in FIG. 16 to facilitate even application of moderate pressure to grommet 158 upon rotation of lock nut 166 on a shaft portion of mounting bolt 162. The arrangement and relative location of the mounting bolt/lock nut/grommet combinations 161 securing the load cell mounting plate 152 to upstanding frame member 30 and the positions of nut bolt combinations 206 securing load cell enclosure box 154 to load cell mounting plate 152 shown in FIG. 16 are preferably essentially the same as depicted in FIG. 19 and as discussed above relative to FIG. 14.

Figure 17:
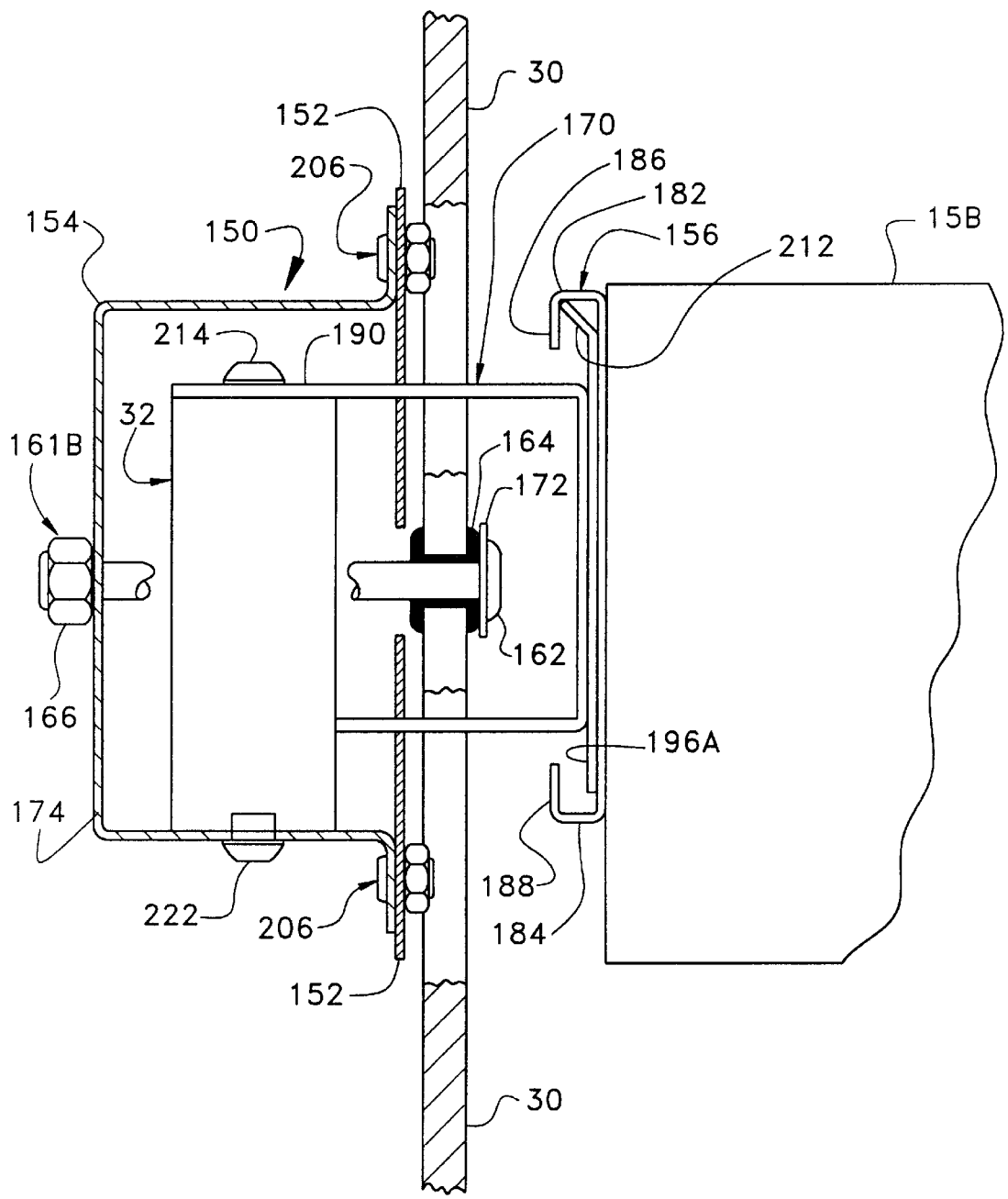
FIG. 17 is an enlarged broken side view of a load cell and associated structure, similar to FIG. 14, connecting a weigh bin to a frame of a weigh scale blender including means for shock and vibration isolating the load cell from the frame in accordance with a second preferred embodiment of the invention for single load cell blenders.

FIG. 17 illustrates yet another embodiment for a single load cell weigh scale blender. The structure in FIG. 17 is similar to that illustrated in FIGS. 14, 15 and 16. However, as is illustrated in FIG. 17, grommet 158 of the mounting bolt/lock nut/grommet combination 161 is provided in position about frame member 30, as contrasted to load cell mounting plate 152. In this position grommet 158 prevents any metal-to-metal contact between mounting bolt 162 and upstanding frame member 30. A washer 172 is provided to distribute force resulting from head 162 pressing against grommet 158.

In the structure illustrated in FIG. 17, bolt 162 extends not only through upstanding frame member 30 but past load cell mounting plate 152 and through an aperture formed in vertically upstanding portion 174 of load cell enclosure box 154. Lock nut 166 bears against the exterior surface of vertically upstanding portion 174 of load cell enclosure box 154 as illustrated in FIG. 17.

As a further variation in FIG. 17 the load transfer plate has been designated 196A and includes an angled tip portion 212 at the upper vertical extremity thereof. Angled tip portion 212 fits against an inwardly facing surface of upper vertically extending extremity of 186 of weigh bin bracket 156 and against a downwardly facing surface of upper end horizontally extending portion 182 of weigh bin bracket 156 to prevent rotation or canting of weigh bin 15B relative to load cell 32 and especially load transfer beam 170. This results in preferably flush, facing contact between vertical portion 180 of weigh bin bracket 156 and load transfer plate 196A. Similarly to the embodiments illustrated in FIGS. 14 and 16, load transfer plate 196A is fixedly connected to load transfer beam 170 while weigh bin bracket 156 is fixedly connected to weigh bin 15B; some small sliding complemental motion is permitted between load transfer plate 196A and weigh bin bracket 156 to facilitate easy installation of the weigh bin and removal thereof for cleaning. Such sliding motion is perpendicular to the plane of the paper in FIG. 17.

Respecting orientation and relative location of mounting bolt/lock nut/grommet combination 161 vis-a-vis nut/bolt combinations 206 for the structure illustrated in FIG. 17, mounting bolt/lock nut/grommet combination 161 is preferably laterally displaced substantially from load cell 32, with a mounting bolt/lock nut/grommet combination 161 positioned on either side of load cell 32 at a common vertical position relative to load cell 32. Nut/bolt combinations 206 are preferably located inboard of the mounting bolt/lock nut/grommet combinations 161B in a manner similar to that illustrated in FIG. 19. The load cell enclosure box 154 illustrated in FIG. 17 is longer in length longitudinally that illustrated in FIG. 19 in order to horizontally overlap to at least some extent the two vertically upstanding members 30 forming a portion of frame 14, in order that grommet 158 and bolt 160 could be positioned in frame member 30 and still engage the facing side of load cell enclosure box 154 as illustrated in FIG. 17.

Structure for vibration and shock-isolating load cells 32 from upstanding members 30 of frame 14 in a dual load cell weigh scale blender is illustrated in FIGS. 13, 18 and 19. A load transfer beam 170-2 is fixedly connected to an upper portion of load cell 32 by suitable screw connectors 214. Load transfer beam 170-2 in the embodiment illustrated in FIGS. 18 and 19 is of generally inverted U-shaped configuration, having a horizontal portion 216 extending across the top of load cell 32 and having vertically downwardly directed lateral extremities 218, 220.

Load cell 32 is fixedly connected to the bottom of load cell enclosure box 154 via screw connectors 222 illustrated in FIGS. 18 and 19. Screw connectors 222 which rigidly hold the load cell in position vis-a-vis the load cell enclosure box. Hence the bottom of the load cell is fixed whereas the upper portion of the load cell, where the load is sensed, is free to deflect in response to loads applied as result of material being in the weigh bin.

Fitting slidably within apertures, which have not been shown in the drawings, formed in horizontal portion 216 of load transfer beam 170-2 are a pair of hanger screws 224 having long shafts. Each of hanger screws 224 fit slidably through an aperture in horizontal portion 216 of load transfer beam 170-2 with the shaft portions of screws 224 passing slidably through the apertures but the head portions of hanger screws 224 being too large. As a result hanger screws hang freely from horizontal portion 216 of load transfer beam 170-2. Preferably fitted about the shafts of hanger screws 224 are coil springs 160 which serve to provide some bias and resilience in the event hanger screw 224 and/or weigh bin 15, which is suspended therefrom, as illustrated in FIG. 13, are jostled.

Located at lower extremities of hanger screws 224 are nut and washer combinations 226. Nuts of combinations 226 are threaded on hanger screws 224.

Supported by the washers of combinations 226 are zig zag brackets 23 which support weigh bin 15.

With this construction the entire weight of weigh bin 15 and any material contained therein is transferred to the washers of combinations 226 by zig-zag brackets 23. This results in transfer of the weight through hanger screws 224 to horizontal portion 216 of load transfer beams 170-2 with load cell 32 thereby being stressed and sensing the weight of bin 15 and any material contained therein.

In the dual load cell embodiment illustrated in FIGS. 13, 18 and 19 the load cell mounting plate 152 has been depicted outboard of frame members 130.

In FIG. 18 grommet 158 has been depicted as being partially occluded by load cell mounting plate 152, for purposes of drawing clarity. Similarly to the other embodiments illustrated, mounting bolt/lock nut/grommet combination 161 isolates load cell mounting structure 150 and particularly load cell mounting plate 152 from shock and vibration which is present in vertical frame members 30, by virtue of rubber grommet 158 completely separating mounting bolt 162 from load cell mounting plate 152 or frame 30; grommet 158 additionally separates load cell mounting plate 152 from frame 30, in the manner described above for the single load cell embodiments.

For both the single and dual load cell versions of the weigh scale blender, grommet-connecting the load cell mounting structure to the load cell mounting plate, in the embodiments in which the grommet engages the load cell mounting plate, or grommet-connecting the load cell mounting structure and mounting plate to the frame members, is best accomplished using just a pair of grommet connectors, aligned along a horizontally extending longitudinal or axial axis. Having the grommet connectors horizontally aligned axis provides an axis about which the load cell (or cells in the dual load cell versions of the weigh scale blender) may slightly rotate in response to the damped vibration or shock loading; the damping results from presence of the grommet (s). This arrangement seems to be superior to mounting arrangements in which the grommet mounts are provided in arrangements which are both horizontally and vertically aligned, such as at the corners of a rectangle, or other arrangements which due to their geometry do not provide for an axis about which the load cell and its mounting structure may move in response to shock and vibration in the frame of the weigh scale blender.

Finally, it is important that the mounting bolt not be turned too tightly, compressing the grommet excessively. If the bolt is too tight, the grommet, being highly compressed, has its shock and vibration damping properties compromised. For best results, the mounting bolt should only be tightened to a degree at which the grommet is just showing the slightest bit of visually detectable deformation due to being compressed.

Suitable load cells are available from Tedea Huntleigh, an Israeli company. Model 1010 load cells available from Tedea Huntleigh are particularly suitable.

Grommet 158 is available from NTT/Smith in the United States as part number 920-2170. This grommet has an inside diameter of one quarter inch, an outside diameter of ⅝ of an inch and a groove width of ¹⁄₁₆ of an inch, thereby permitting the grommet to fit easily within load cell mounting plate 152. This grommet has a groove diameter of ⅜ of an inch and an overall thickness of one quarter of an inch.

Suitable solenoid actuated valves are available in the United States under the trademark MAC; the model 45A-LOO-DDAA-1BA9 is particularly suitable.

I claim the following:

1. A method for preparing plastic resin material for manufacturing processing such as molding or extrusion, comprising the steps of:

a. monitoring weight of material, if any, at a weighing station;

b. metering respective solid resinous materials to said weighing station until preselected weights of said respective materials are at said station;

c. metering liquid color to said weighing station to join at least one of said materials until a preselected weight of said liquid color is at said station;

d. providing said metered materials and said preselected weight of liquid color material unitarily to a mixing station;

e. mixing said unitarily supplied metered materials and said preselected weight of liquid color into a blend preparatory to said manufacturing processing via molding or extrusion.

2. The method of claim 1 wherein said monitoring is performed continuously.

3. The method of claim 1 wherein said metering of liquid color is performed peristaltically.

4. The method of claim 1 wherein metering is performed serially.

* * * * *